United States Patent Office 2,948,065
Patented Aug. 9, 1960

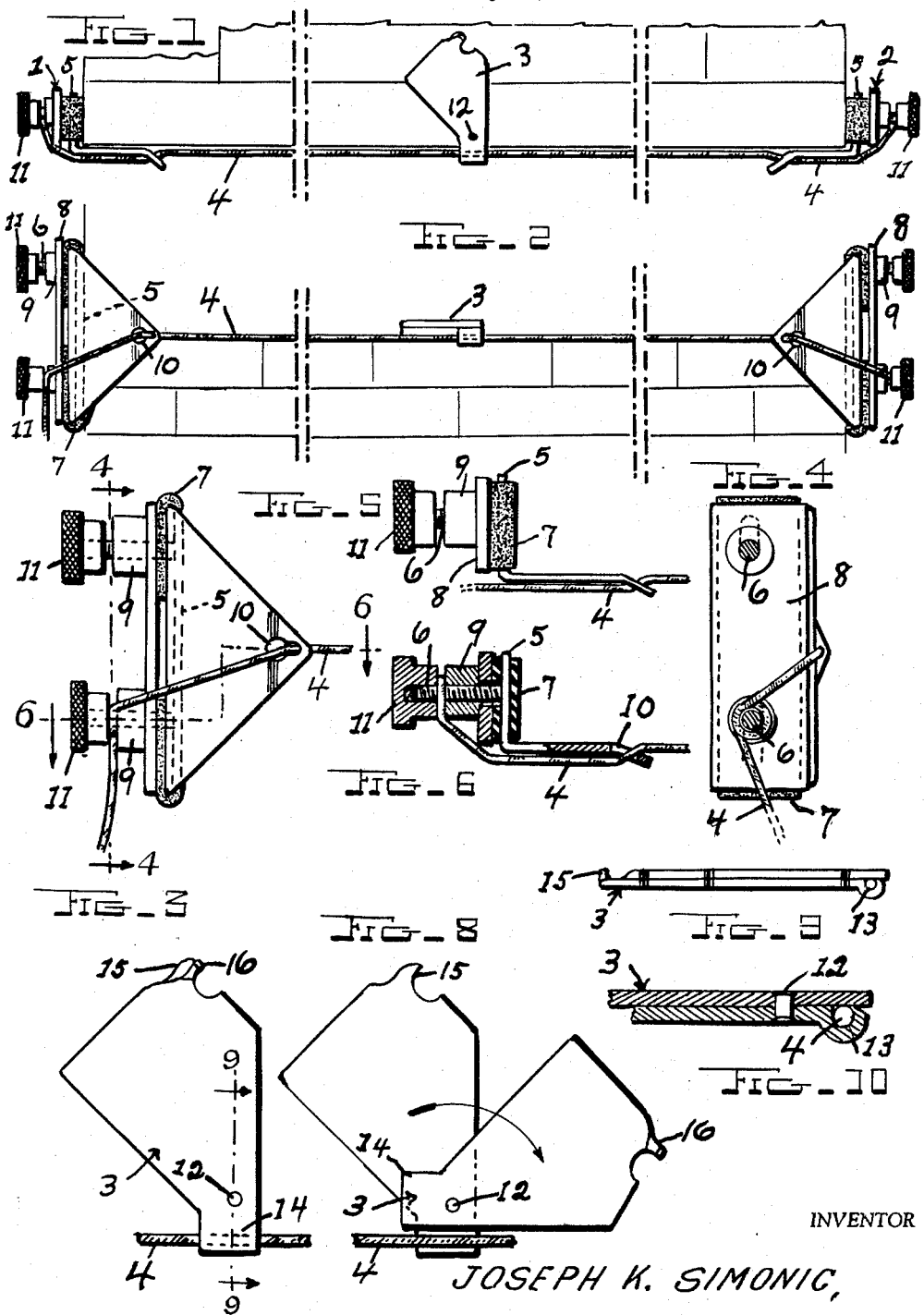

2,948,065

MASONS' LINE HOLDING DEVICE

Joseph K. Simonic, Burnham, Pa.

Filed May 28, 1957, Ser. No. 662,146

3 Claims. (Cl. 33—85)

This invention relates to a line guide for masons and bricklayers and comprises a unique construction, in that, no cement or other adhesive is required to anchor the rubber or other non-slip pad on the wall engaging members.

It is an object of the invention to produce a particular construction for supporting the non-slip wall engaging pad without the use of cement or any other adhesive material.

Specific objects of this invention will be further disclosed in the detailed description of the accompanying drawings which constitute a part of this application and in which:

Fig. 1 is a plan view of a portion of a masonry wall with applicant's line guide applied thereto.

Fig. 2 is a side elevational view of a portion of a wall with the line guide applied thereto.

Fig. 3 is a side elevational view of one end member of the guide construction with the line adjustably connected thereto.

Fig. 4 is a sectional view taken on the line 4—4 of Fig. 3 with the line adjustably applied thereon.

Fig. 5 is a plan view of one end member of the construction.

Fig. 6 is a sectional view of one end member taken on the line 6—6 of Fig. 3.

Fig. 7 is a plan view of the line support located intermediate the ends of the line to prevent undue sagging of the line.

Fig. 8 is a plan view of the line support in an open condition to slidably receive the line.

Fig. 9 is an edge elevational view of the intermediate support.

Fig. 10 is a sectional view taken on the line 9—9 of Fig. 7.

This application is in part a continuation of my previous application Ser. No. 562,385, filed Jan. 31, 1956, for "Mason Line Holding Device," now abandoned.

This new application represents a totally clarified disclosure of my previous application herein identified.

The construction or device comprises a new and complete combination of two substantially identical end members 1 and 2 plus an intermediate support member 3. The member 3 prevents undue sagging of the portion of the line 4 intermediate the members 1 and 2.

Each end member comprises an angular element having two sheet metal portions, a rectangular portion 5 and line supporting portion 5, secured together, preferably integral, and said portions being at right angles to each other.

One portion 5 is provided with two screw threaded bolts 6 fixed thereon and extending outwardly therefrom at substantially a right angle.

A pad, preferably a strip, of sheet rubber 7 or suitable stretchable fabric having clinging or non-slipping quality is provided with apertures in each end thereof, whereby said strip may engage over one bolt 6 and be stretched over the inner face of portion 5 to engage and embrace the other bolt 6. This construction provides the application of the non-slip pad without the use of cement or any other adhesive.

Of course, rubber bands, not shown, could be used to stretch over the portion 5 on either side or both sides of the bolts 6.

An apertured plate 8 is superposed over the apertured ends of the pad or strip and is clamped thereon by means of the screw threaded nuts 9.

The line 4 is reeved through apertures 10 of the end members and at each of its end portions, said line or cord is secured by clamping nuts 11 on each end member.

The support 3 comprises upper and lower plates swiveled together by the pin or rivet 12. The lower plate is provided with a groove or channel 13 to slidably receive the line or cord 4. The upper plate of support 3 is provided with an extension 14 which projects over the channel 13 and the cord 4 in captive but slidable position in the support 3.

The broad swiveled plates of the support 3 are sufficiently heavy to maintain itself through the action of gravity and to maintain the cord 4 in a proper non-sagging condition.

The end members 1 and 2, support 3 and plate 8 are preferably made of suitable rust resisting material, such as, aluminum alloy.

The bolts 6 and the rivet 12 are preferably made of brass.

The ears 15 and 16 constitute means for the swivelling of the plates of support 3 relative to each other.

Having fully disclosed my said invention, what I claim is:

1. In a masons' line guide for a wall being built, said guide having end members constituting line holding means, each end member defining one rectangular portion and a line supporting portion apertured to receive a guide line and support the same, said rectangular portion having threaded bolts extending therefrom, said portions being substantially at a right angle to each other, said bolts having first and second nuts on each bolt, a stretchable rubber strip having apertured ends, said strip being stretched over said rectangular portion, and, respectively, anchored over said bolts, a plate having apertures received, respectively, by said bolts and extending over the apertured ends of said strip and clamped to said rectangular portion by said first nuts on each bolt and said second nuts adapted to clamp the line against said first nuts.

2. In a masons' line guide for a wall being built, comprising bolts, a line, a stretchable strip, a plate having apertures and end members, each end member having a line supporting portion and a substantially rectangular wall engaging portion, said portions being substantially at right angles to each other and adapted to engage a corner of a wall being built, said bolts extending from said rectangular portion, a stretchable strip of rubber having apertured ends, whereby said strip can be stretched about said rectangular portion and anchored, respectively, on said bolts, said apertured plate receiving said bolts and engaging and clamping the apertured ends of said strip against said rectangular portion, a first nut on each of said bolts engaging said apertured plate and clamping the same against the apertured ends of said strip, second nuts on said bolts adapted to clamp said line against one of said first nuts.

3. In a masons' line guide for a wall being built, comprising end members, a line, bolts, nuts, a stretchable strip and a clamping bar, said members being connected to and supporting the line, screw threaded bolts fixed to each member and extending outwardly therefrom, each member having a line engaging and supporting portion for said line, and a rectangular portion, said portions being substantially at a right angle to each other, the combination comprising a stretchable fabric strip having apertures in each of its end portions, said strip being stretched across the rectangular portion of said member and anchored, respectively, by its apertured ends on said bolts, said clamping bar being apertured and receiving said bolts and being superposed on the apertured ends of said strip and clamped thereon by said nuts on said threaded bolts, an additional nut on one of the bolts for gripping a portion of said line between one of said first mentioned nuts and said additional nut.

References Cited in the file of this patent

UNITED STATES PATENTS

| | | |
|---|---|---|
| 540,361 | Meckel | June 4, 1895 |
| 817,357 | Zugelder | Apr. 10, 1906 |
| 1,075,166 | Smyth | Oct. 7, 1913 |
| 1,544,368 | Brennan | June 30, 1925 |
| 2,457,076 | Williams | Dec. 21, 1948 |

FOREIGN PATENTS

| | | |
|---|---|---|
| 287,642 | Great Britain | Mar. 26, 1928 |